(12) United States Patent
Kwon et al.

(10) Patent No.: US 8,373,370 B2
(45) Date of Patent: Feb. 12, 2013

(54) SENSORLESS CONTROL METHOD OF HIGH PERFORMANCE PERMANENT MAGNET SYNCHRONOUS MOTOR DURING EMERGENCY OPERATION

(75) Inventors: Soon Woo Kwon, Gyeonggi-Do (KR); Seo Ho Choi, Seoul (KR); Joon Yong Lee, Seoul (KR); Kwang Hee Nam, Gyeongsangbuk-Do (KR); Jin Seok Hong, Incheon (KR); Sung Yoon Jung, Seoul (KR); Tae Heon Kim, Seoul (KR)

(73) Assignees: Hyundai Motor Company, Seoul (KR); Kia Motors Corporation, Seoul (KR); Postech Academy-Industry Foundation, Pohang, Gyeongsangbuk-Do (KR)

( * ) Notice: Subject to any disclaimer, the term of this patent is extended or adjusted under 35 U.S.C. 154(b) by 334 days.

(21) Appl. No.: 12/829,669

(22) Filed: Jul. 2, 2010

(65) Prior Publication Data

US 2011/0025241 A1 Feb. 3, 2011

(30) Foreign Application Priority Data

Jul. 6, 2009 (KR) .................. 10-2009-0061033

(51) Int. Cl.
*H02P 6/16* (2006.01)
(52) U.S. Cl. .............. 318/400.04; 318/601; 318/721; 318/700; 318/632; 318/400.01; 318/615
(58) Field of Classification Search ............. 318/400.32, 318/400.33, 400.14, 700, 400.01, 798, 799, 318/800, 802, 601, 721, 632, 615, 400.04
See application file for complete search history.

(56) References Cited

U.S. PATENT DOCUMENTS

| | | | | |
|---|---|---|---|---|
| 5,834,918 A | * | 11/1998 | Taylor et al. | 318/601 |
| 6,064,172 A | * | 5/2000 | Kuznetsov | 318/716 |
| 6,462,492 B1 | * | 10/2002 | Sakamoto et al. | 318/400.32 |
| 6,492,788 B1 | * | 12/2002 | Agirman et al. | 318/700 |
| 6,825,637 B2 | * | 11/2004 | Kinpara et al. | 318/700 |
| 6,933,701 B2 | * | 8/2005 | Kinpara et al. | 318/700 |
| 7,064,504 B2 | * | 6/2006 | Imai et al. | 318/400.04 |
| 7,098,623 B2 | * | 8/2006 | Piippo | 318/721 |
| 7,180,263 B2 | * | 2/2007 | Maeda et al. | 318/719 |
| 7,221,152 B2 | * | 5/2007 | Piippo | 324/207.25 |
| 7,352,151 B2 | * | 4/2008 | Fujitsuna et al. | 318/721 |
| 7,482,777 B2 | * | 1/2009 | Tomigashi | 318/807 |
| 7,679,308 B2 | * | 3/2010 | Tomigashi | 318/807 |
| 8,008,878 B2 | * | 8/2011 | Gotz et al. | 318/400.02 |

FOREIGN PATENT DOCUMENTS

| | | |
|---|---|---|
| JP | 2003-274700 A | 9/2003 |
| JP | 2005-269761 A | 9/2005 |
| JP | 2007-151344 A | 6/2007 |
| KR | 10 2004 0041222 | 5/2004 |

* cited by examiner

*Primary Examiner* — Rita Leykin
(74) *Attorney, Agent, or Firm* — Edwards Wildman Palmer LLP; Peter F. Corless (57) ABSTRACT

The present invention provides a position sensorless control method of a high performance permanent magnet synchronous motor during emergency operation, which can accurately detect a magnetic pole position of the synchronous motor based on a position sensorless vector control using an adaptive observer configured based on a permanent magnet synchronous motor model.

3 Claims, 6 Drawing Sheets

SENSORLESS CONTROL METHOD OF HIGH PERFORMANCE PERMANENT MAGNET SYNCHRONOUS MOTOR DURING EMERGENCY OPERATION

CROSS-REFERENCE TO RELATED APPLICATION

This application claims under 35 U.S.C. §119(a) the benefit of Korean Patent Application No. 10-2009-0061033 filed Jul. 6, 2009, the entire contents of which are incorporated herein by reference.

BACKGROUND (a) Technical Field

The present disclosure relates, generally, to a position sensorless detection method of a high performance permanent magnet synchronous motor during emergency operation. More particularly, it relates to a position sensorless control method of a high performance permanent magnet synchronous motor during emergency operation, which can accurately detect a magnetic pole position of the synchronous motor based on a position sensorless vector control using an adaptive observer that is configured based on a permanent magnet synchronous motor model.

(b) Background Art

An inverter for controlling a motor generally comprises a converter unit, an inverter unit, and a control unit. Generally, the converter unit, which is composed of a three-phase full-wave rectifier circuit and a smoothing circuit, smoothes an alternating current and outputs a current with a small ripple component. The inverter unit generates an alternating current having a predetermined frequency by switching the direct current converted by the converter unit by means of a semiconductor device such as a transistor. The controller, which is composed of an operation circuit, a detection circuit, a drive circuit, etc., controls the switching of the inverter and the voltage of the converter and performs various protection functions.

Control methods typically used in the inverter include a pulse width modulation (PWM) control method and a vector control method. The PWM control method is used to control the frequency and the output voltage (or current) by means the inverter unit, in which the semiconductor device is switched by high frequency to change the width of the switching pulse, thus controlling the voltage (or current).

The vector control method is used to suitably control the current of the motor by dividing it into excitation current and torque current, in which the slip of the motor is detected by a speed detector to suitably calculate the magnitude of load and a current suitable for the torque according to the magnitude of load is applied to the motor, thus ensuring a predetermined excitation current.

In order to control the motor according to a conventional method, first of all, it is necessary to suitably detect an initial magnetic pole position and determine a rotational speed and a magnetic pole position during control. Second, it is necessary to carry out vector control since a stable control is not available during voltage/frequency (V/F) control. And third, it is necessary to determine an initial angular position of a motor rotor to perform the vector control, it is necessary to divide the current of the motor into excitation current and torque current, and it is necessary to measure the speed and position of the motor rotor for this operation process.

Various sensorless control methods for the motor control have been proposed and include, for example, a method of using extended electromotive force (EEMF), a method of obtaining speed and position by estimating the magnetic flux using an observer, and the like.

However, there remains a need in the art for a sensorless detection method of a high performance permanent magnet synchronous motor during emergency operation.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a position sensorless control method of a high performance permanent magnet synchronous motor during emergency operation. Preferably, in exemplary embodiments of the present invention, an adaptive observer, which is based on a voltage applied to the motor and a measured current, reflects position and speed error information, and is suitably configured from an approximated synchronous coordinate current differential equation model constructed based on a magnetic pole position (with an error from the actual magnetic pole position) estimated based on a mathematical model of the permanent magnet synchronous motor such that a magnetic pole position, which can make a magnetic pole position error equal to zero, can be suitably estimated using a phase lock loop (PLL) controller from a position error obtained using an adaptive law of the adaptive observer.

In a preferred embodiment, the present invention provides a position sensorless control method of a high performance permanent magnet synchronous motor during emergency operation, the method including constructing an approximated synchronous coordinate current differential equation model based on a magnetic pole position suitably estimated based on a mathematical model of the permanent magnet synchronous motor; configuring an adaptive observer, which is based on a voltage applied to the motor and a measured current and reflects position and speed error information from the approximated synchronous coordinate current differential equation model; obtaining a position error using an adaptive law of the adaptive observer; and suitably estimating a magnetic pole position, which makes a magnetic pole position error equal to zero, using a phase lock loop (PLL) controller from the obtained position error.

In a preferred embodiment of the present invention, the construction of the approximated synchronous coordinate current differential equation model may include obtaining error information of the magnetic pole position based on the mathematical model of the permanent magnet synchronous motor; suitably approximating the error information to a simpler formula; and converting the approximated formula into a differential equation for configuring the adaptive observer.

In another preferred embodiment, the obtaining of the position error using the adaptive law of the adaptive observer may preferably include defining an observation error using the converted differential equation and a formula reflecting the position and speed errors and deriving a differential equation for the error; obtaining a final observation error by finding a solution of the differential equation for the error; defining a cost function of the final observation error to make the observation error equal to zero and providing speed error information required by the adaptive observer using a gradient law; and suitably obtaining the position error from the formula reflecting the position and speed errors of the adaptive observer.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features

As described herein, the present invention features a position sensorless control method of a high performance permanent magnet synchronous motor during emergency operation, the method comprising constructing an approximated synchronous coordinate current differential equation model, configuring an adaptive observer, obtaining a position error using an adaptive law of the adaptive observer; and estimating a magnetic pole position.

In one embodiment, the approximated synchronous coordinate current differential equation model is based on a magnetic pole position estimated based on a mathematical model of the permanent magnet synchronous motor.

In another embodiment, configuring the adaptive observer is based on a voltage applied to the motor and a measured current and reflects position and speed error information from the approximated synchronous coordinate current differential equation model.

In another further embodiment, estimating the magnetic pole position makes a magnetic pole position error equal to zero, and using a phase lock loop (PLL) controller from the obtained position error.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The various sensorless control methods for motor control that have been proposed necessarily require modeling of a motor system and, since the rotation angle of the motor is estimated using an equation of state based on the modeling of the motor system, the modeling should preferably be done in accordance with the actual system or the controller should estimate the rotation angle only with the basic equation of state.

Further, according to the conventional method of directly estimating the magnetic pole position (rotation angle) using the equation of state, it is difficult to construct the observer since the equation of state used in the observer should suitably reflect the actual system.

Figure 1:
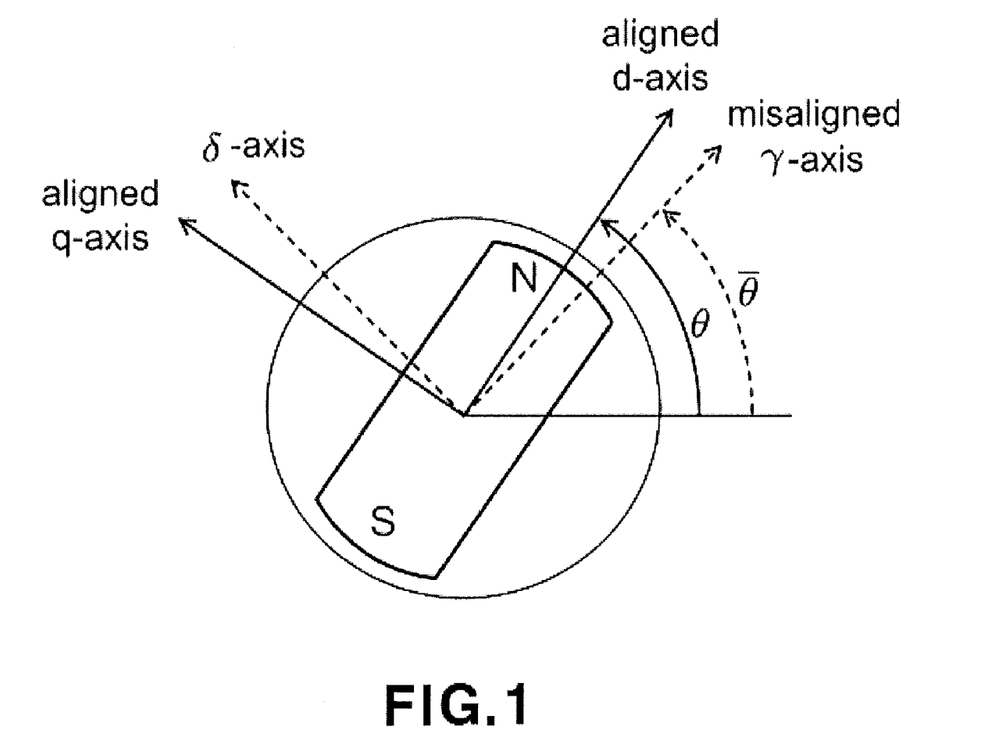
FIG. 1 is an exemplary schematic diagram showing an aligned coordinate system and a misaligned coordinate system of a rotor of a permanent magnet synchronous motor.

Here, the method of estimating the magnetic pole position based on the conventional sensorless vector control method is described, and a process of operating an algorithm applied to the method is explained by the following formulas.

$$\begin{bmatrix} v_d \\ v_q \end{bmatrix} = \begin{bmatrix} R_a + pL_d & -\omega L_q \\ \omega L_d & R_a + pL_q \end{bmatrix} \begin{bmatrix} i_d \\ i_q \end{bmatrix} + \begin{bmatrix} 0 \\ w\psi_a \end{bmatrix} \quad \text{[Formula 1]}$$

The above formula 1 is equivalent to the motor voltage equation in the rotor coordinate system shown in FIG. 1, wherein Vd and Vq represent the d-axis voltage and the q-axis voltage, respectively, id and iq represent the d-axis current and the q-axis current, respectively, and R and L represent the inductance, respectively.

Moreover, the motor voltage equation in a misaligned coordinate system for estimating the position error of the rotor can be represented by the following formula 2:

$$\begin{bmatrix} v_\gamma \\ v_\delta \end{bmatrix} = \begin{bmatrix} R_a + pL_d & -\omega L_q \\ \omega L_d & R_a + pL_q \end{bmatrix} \begin{bmatrix} i_\gamma \\ i_\delta \end{bmatrix} + \begin{bmatrix} \varepsilon_\gamma \\ \varepsilon_\delta \end{bmatrix} \quad \text{[Formula 2]}$$

where $$\begin{bmatrix} \varepsilon_\gamma \\ \varepsilon_\delta \end{bmatrix} =$$

-continued $$\omega\psi_a\begin{bmatrix}-\sin\theta_e\\\cos\theta_e\end{bmatrix}+L_ap\begin{bmatrix}i_\gamma\\i_\delta\end{bmatrix}+\omega L_b\begin{bmatrix}i_\gamma\\i_\delta\end{bmatrix}+(\hat{\omega}-\omega)L_c\begin{bmatrix}i_\gamma\\i_\delta\end{bmatrix}$$

The above formula 2 is equivalent to the motor voltage equation in the misaligned coordinate system shown in FIG. 1, wherein Vγ and Vδ represent the misaligned γ-axis voltage and δ-axis voltage, respectively, iγ and iδ represent the misaligned γ-axis current and δ-axis current, respectively, R and L represent the inductance, respectively, and eγ and eδ represent the error information, respectively.

Next, the equation is approximated based on the above formula 2 by assuming that Ld−Lq=0, and the approximation process can be expressed by the following formula 3:

$$L_a=\begin{bmatrix}-(L_d-L_q)\sin^2\theta_e & (L_d-L_q)\sin\theta_e\cos\theta_e\\(L_d-L_q)\sin\theta_e\cos\theta_e & (L_d-L_q)\sin^2\theta_e\end{bmatrix}$$ [Formula 3]

$$L_b=\begin{bmatrix}-(L_d-L_q)\sin\theta_e\cos\theta_e & -(L_d-L_q)\sin^2\theta_e\\-(L_d-L_q)\sin^2\theta_e & (L_d-L_q)\sin\theta_e\cos\theta_e\end{bmatrix}$$

$$L_c=\begin{bmatrix}(L_d-L_q)\sin\theta_e\cos\theta_e & -L_d\cos^2\theta_e-L_q\sin^2\theta_e\\L_d\sin^2\theta_e+L_q\cos^2\theta_e & -(L_d-L_q)\sin\theta_e\cos\theta_e\end{bmatrix}$$

Through the approximation process, the error angle θe of the magnetic pole position can be estimated by the following formula 4:

$$\theta_e=\theta-\bar{\theta}, L_d-L_q:\text{motor saliency}$$ [Formula 4]

However, since the above formulas 2 to 4 are very complicated, it can be difficult to design the algorithm. Accordingly, the equation is approximated by assuming that Ld−Lq=0, or the above formula 1 is converted into the misaligned coordinate system to estimate the rotor position after disregarding the error term of the speed assuming that the error is small, as represented by the following formula 5:

$$\begin{bmatrix}V_\gamma\\V_\delta\end{bmatrix}=\begin{bmatrix}R_a+pL_d & -\omega L_q\\\omega L_q & R_a+pL_d\end{bmatrix}\begin{bmatrix}i_\gamma\\i_\delta\end{bmatrix}+\begin{bmatrix}e_\gamma\\e_\delta\end{bmatrix}$$ [Formula 5]

Disregarded assuming that the error is small (approximated to zero)

$$\begin{bmatrix}e_\gamma\\e_\delta\end{bmatrix}=E_{ex}\begin{bmatrix}-\sin\theta_e\\\cos\theta_e\end{bmatrix}+(\hat{\omega}/\omega)L_d\begin{bmatrix}-i_\delta\\i_\gamma\end{bmatrix}.$$

$$E_{ex}=\omega[(L_d-L_q)i_d+\psi_a]-(L_d-L_q)(pi_q)$$

Figure 2:
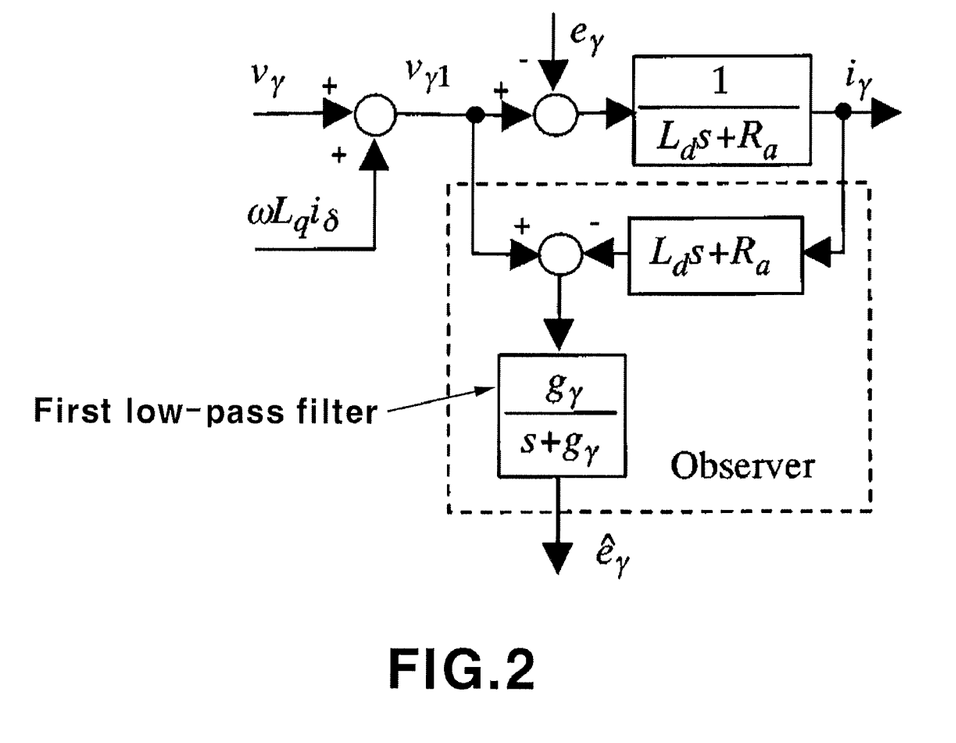
FIG. 2 is a block diagram showing the configuration of a first observer for EMP estimation.

Then, a first observer of FIG. 2 is configured from the voltage equation approximated in the estimated coordinate system, i.e., the above formula 5, and terms eγ and eδ are calculated by the following formula 6:

$$\begin{bmatrix}\hat{e}_\gamma\\\hat{e}_\delta\end{bmatrix}=E_{ex}\begin{bmatrix}-\sin\hat{\theta}_e\\\cos\hat{\theta}_e\end{bmatrix}$$ [Formula 6]

Figure 3:
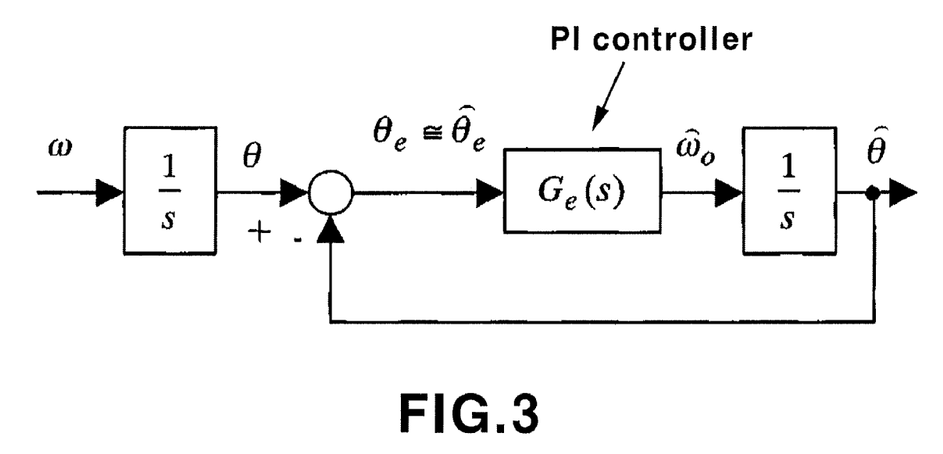
FIGS. 3 and 4 are an equivalent block diagram and a flowchart of a conventional speed and position estimator.

The error information is estimated based on $$\hat{\theta}_e=\tan^{-1}\left(-\frac{\hat{e}_\gamma}{\hat{e}_\delta}\right)$$

obtained from formula 6, and the actual position of the rotor is estimated from this error information using a speed and position estimator based on a PI controller as shown in FIG. 3.

That is, the PI controller estimates the actual position of the rotor by performing a proportional integral operation such that the error between the estimated rotation angle $$\hat{\theta}_e=\tan^{-1}\left(-\frac{\hat{e}_\gamma}{\hat{e}_\delta}\right)$$

and the rotation angle θ actually input to the system becomes '0'.

Figure 4:
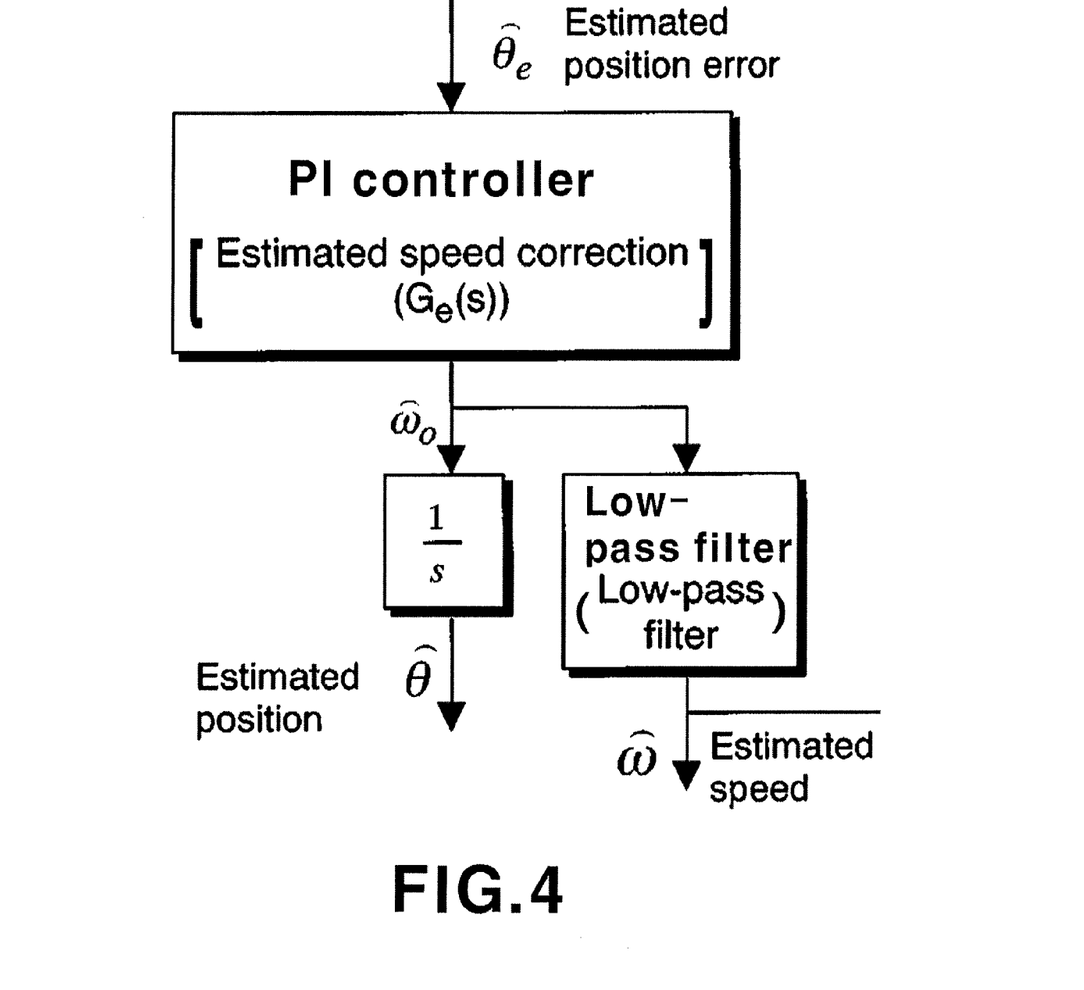

The speed and position estimator of FIG. 3 estimates the speed information derived from the output of the PI controller to obtain the speed information required by formula 5 using a first low-pass filter shown in FIG. 4.

According to this conventional sensorless control method, the magnetic pole position is estimated by approximating the equation assuming that Ld−Lq=0 due to the complexity of the formulas used in the algorithm operation, but this approximation causes an estimation error in estimating the position.

Moreover, since the speed error is disregarded assuming that the error is small in formula 5, the dynamic performance characteristics of the control algorithm are suitably reduced in a transient state (during acceleration/deceleration of the motor and during application of load), which makes it difficult to apply this method to the vehicle motor.

That is, since the transient state occurs frequently due to the irregularity of the load in terms of the characteristics of the operating environment during the control of the electric vehicle motor, the dynamic performance characteristics of the motor control become more important, and thus the reduction of the dynamic performance characteristics of the control algorithm makes it difficult to apply this method to the vehicle motor.

Furthermore, when the observer of FIG. 2 is constructed based on formula 5, it is vulnerable to noise of an input signal due to the use of numerical differentiation, and thus the first low-pass filter of FIG. 2 is used to compensate for the noise. In addition, when the speed and position estimator of FIG. 4 estimates the speed, the first low-pass filter is also used, and thereby the dynamic performance characteristics of the motor are suitably reduced.

In preferred embodiments, the present invention provides a sensorless control method which can estimate a rotational speed and a magnetic pole position of a motor from a voltage equation in a rotor coordinate system based on a magnetic pole position (with an error from the actual magnetic pole position) estimated based on a mathematical model of the permanent magnet synchronous motor, thereby simply and accurately estimating the magnetic pole position.

In a first embodiment, an approximated synchronous coordinate current differential equation model is suitably constructed based on the magnetic pole position estimated based on the mathematical model of the permanent magnet synchronous motor.

$$\bar{v}_d^e = \qquad \text{[Formula 7]}$$

$$\left(r_s + \frac{3}{2}L_2\bar{\omega}\sin2(\theta-\bar{\theta})\right)\bar{i}_d^e + \left(L_e - \frac{3}{2}L_2\cos2(\theta-\bar{\theta})\right)(p\bar{i}_d^e) -$$

$$\bar{\omega}\left(L_e + \frac{3}{2}L_2\cos2(\theta-\bar{\theta})\right)\bar{i}_q^e - \omega\psi_m\sin(\theta-\bar{\theta}) + E_D$$

$$\bar{v}_q^e = \left(r_s - \frac{3}{2}L_2\bar{\omega}\sin2(\theta-\bar{\theta})\right)\bar{i}_q^e +$$

$$\left(L_e + \frac{3}{2}L_2\cos2(\theta-\bar{\theta})\right)(p\bar{i}_q^e) +$$

$$\bar{\omega}\left(L_e - \frac{3}{2}L_2\cos2(\theta-\bar{\theta})\right)\bar{i}_d^e - \omega\psi_m\cos(\theta-\bar{\theta}) + E_Q.$$

According to certain exemplary embodiments, the above formula 7 is equivalent to the motor voltage equation in the misaligned coordinate system shown in FIG. 2, wherein $\bar{v}_d^e$ and $\bar{v}_q^e$ represent the d-axis voltage and the q-axis voltage in the misaligned coordinate system, respectively, $i_d$ and $i_q$ represent the d-axis current and the q-axis current in the misaligned coordinate system, respectively, L represents the inductance, and $E_D$ and $E_Q$ represent the error information, respectively.

According to formula 7, the variables with an overline represent the values in the misaligned coordinate system, the variable with no overline represent the values in the actual rotor coordinate system, and p represents d/dt.

$E_D$ and $E_Q$ in formula 7 can be represented by the following formula 8:

$$E_D = -\frac{3}{2}L_2\sin2(\theta-\bar{\theta})(p\bar{i}_q^e) - \qquad \text{[Formula 8]}$$

$$3L_2(\omega-\bar{\omega})(\bar{i}_q^e\cos2(\theta-\bar{\theta}) - \bar{i}_d^e\sin2(\theta-\bar{\theta}))$$

$$E_Q = -\frac{3}{2}L_2\sin2(\theta-\bar{\theta})(p\bar{i}_d^e) -$$

$$3L_2(\omega-\bar{\omega})(\bar{i}_d^e\cos2(\theta-\bar{\theta}) - \bar{i}_q^e\sin2(\theta-\bar{\theta}))$$

$$L_e = \frac{L_d + L_q}{2}, \quad L_2 = \frac{L_q - L_d}{3}$$

According to preferred embodiments of the present invention, the estimated speed and position are suitably approximated to the actual values, and thus $(\omega-\bar{\omega})$ and $(\theta-\bar{\theta})$ in formula 8 become small. Preferably, when a first approximation process for formula 8 is suitably performed, assuming that there is no change in current, i.e., $pi_d \approx 0$ and $pi_q \approx 0$, the error information $E_D$ and $E_Q$, which can suitably improve the response characteristics in a transient state (during acceleration/deceleration of the vehicle) where the speed error $(\omega-\bar{\omega})$ is considered, can be derived from the following formula 9:

[Formula 9]

$(\omega-\bar{\omega})$ and $(\theta-\bar{\theta})$ are assumed to be small
$pi_d \approx 0$ and $pi_q \approx 0$      Assumption 1

↓

$(\omega-\bar{\omega})\sin(\theta-\bar{\theta}) \approx (\omega-\bar{\omega})(\theta-\bar{\theta}) \in O^2$

↓

$E_D \approx 3L_2 \,[(\omega-\bar{\omega})]\, i_q^{-e}$
$E_Q \approx 3L_2 \,[(\omega-\bar{\omega})]\, i_d^{-e}$

↓

Improve response characteristics in transient state
(acceleration/decelaration control) in terms of speed error

[Formula 10]

$3/2 L_2\bar{\omega}\sin 2(\theta-\bar{\theta}) = 3L_2\bar{\omega}\sin(\theta-\bar{\theta})\cos(\theta-\bar{\theta}) \approx 3L_2\bar{\omega}\sin(\theta-\bar{\theta})$ $L_{dv} = L_e - 3/2 L_2\cos 2(\theta-\bar{\theta}).$     $L_{dv} \approx L_e - 3/2 L_2 \equiv L_d.$
$L_{qv} = L_e + 3/2 L_2\cos 2(\theta-\bar{\theta}).$     $L_{qv} \approx L_e + 3/2 L_2 \equiv L_q.$ $\omega\psi_m\cos(\theta-\bar{\theta}) \approx \bar{\omega}\psi_m\cos(\theta-\bar{\theta}) - \psi_m\cos(\theta-\bar{\theta})$
$\omega\psi_m\sin(\theta-\bar{\theta}) \approx \bar{\omega}\psi_m\sin(\theta-\bar{\theta})$ $\sin(\theta-\bar{\theta}) \approx \theta-\bar{\theta}$ and $\cos(\theta-\bar{\theta}) \approx 1$ In further preferred embodiments, second to fifth approximation processes for formula 7 are suitably performed with respect to each term as shown in the above formula 10 and, as a result, it is possible to derive a simplified formula, which can be represented by the following formula 11, through the first to fifth approximation process:

$$\bar{v}_d^e = (r_{ds} + 3L_2\bar{\omega}\sin(\theta-\bar{\theta}))\bar{i}_d^e + L_{dv}(p\bar{i}_d^e) - \bar{\omega}L_{qv}\bar{i}_q^e - \omega\phi_m$$
$$\sin(\theta-\bar{\theta}) - 3L_2(\omega-\bar{\omega})\bar{i}_q^e$$

$$\bar{v}_q^e = (r_{qs} - 3L_2\bar{\omega}\sin(\theta-\bar{\theta}))\bar{i}_q^e + L_{qv}(p\bar{i}_q^e) + \bar{\omega}L_{dv}\bar{i}_d^e + \omega\psi_m$$
$$\sin(\theta-\bar{\theta}) - 3L_2(\omega-\bar{\omega})\bar{i}_d^e, \qquad \text{[Formula 11]}$$

Next, when the above formula 11 is suitably expressed in the form of a differential equation, formula 11 can be represented by the following formula 12:

[Formula 12]

$$\frac{d}{dt}\begin{bmatrix}\bar{i}_d^e \\ \bar{i}_q^e \\ \theta-\bar{\theta}\end{bmatrix} = A_s(t)\begin{bmatrix}\bar{i}_d^e \\ \bar{i}_q^e \\ \theta-\bar{\theta}\end{bmatrix} + b_s(t)\,[(\omega-\bar{\omega})] + \begin{bmatrix}\bar{\omega}\dfrac{L_q}{L_d}\bar{i}_q^e \\ -\bar{\omega}\dfrac{L_d\bar{i}_d^e + \psi_m}{L_q} \\ 0\end{bmatrix} +$$

Position error    Speed error $$\begin{bmatrix}\dfrac{1}{L_d}\bar{v}_d \\ \dfrac{1}{L_q}\bar{v}_d \\ 0\end{bmatrix}$$

where $$A_s(t) = \begin{bmatrix} -\frac{r_s}{L_d} & 0 & \omega\frac{\psi_m - 3L_2 \bar{i}_d^e}{L_d} \\ 0 & -\frac{r_s}{L_q} & \omega\frac{3L_2}{L_q}\bar{i}_q^e \\ 0 & 0 & 0 \end{bmatrix} \quad \text{and} \quad b_s(t) = \begin{bmatrix} \frac{3L_2}{L_d}\bar{i}_q^e \\ \frac{3L_2\bar{i}_d^e - \psi_m}{L_q} \\ 1 \end{bmatrix}.$$

Subsequently, an adaptive observer, which is based on a voltage applied to the motor and a measured current and reflects position and speed error information, is suitably configured from the approximated synchronous coordinate current differential equation model. That is, in certain preferred embodiments of the present invention, an adaptive observer based on the following formula 13, which reflects the position and speed errors, is suitably configured from the above formula 12:

[Formula 13]

$$\frac{d}{dt}\begin{bmatrix} x_1 \\ x_2 \\ x_3 \end{bmatrix} = A_s \begin{bmatrix} x_1 \\ x_2 \\ x_3 \end{bmatrix} + \underbrace{\hat{p}(t)}_{\text{Parameter for tuning}} \begin{bmatrix} -\omega\frac{L_q}{L_{d_n}}\bar{i}_q^e \\ -\omega\frac{L_d i_d + \psi_m}{L_q} \\ 0 \end{bmatrix} + \begin{bmatrix} \frac{1}{L_d}\bar{v}_d \\ \frac{1}{L_q}\bar{v}_q \\ 0 \end{bmatrix} + \underbrace{K}_{K \in \mathbb{R}^{3\times 2}\ \text{Observer gain}} \begin{bmatrix} \bar{i}_d^e - x_1 \\ \bar{i}_q^e - x_2 \end{bmatrix}$$

wherein $\hat{p}(t)$ represents the parameter for tuning the speed error, and K represents the observer gain.

Next, an observation error e(t) is suitably defined from the above formulas 12 and 13, and a differential equation for the error is suitably derived by the following formula 14:

[Formula 14]

$$e(t) \cong \begin{bmatrix} \bar{i}_d^e(t) - x_1(t) \\ \bar{i}_q^e(t) - x_2(t) \\ \theta - \bar{\theta} - x_3(t) \end{bmatrix}$$

$$\frac{d}{dt}e = (A_s - KC)e + b_s\Delta p(t)$$

$$C = \begin{bmatrix} 1 & 0 & 0 \\ 0 & 1 & 0 \end{bmatrix},$$

$$\Delta p(t) = \omega - \bar{\omega} - \hat{p}(t).$$

Continuously, when finding a solution of the differential equation for the error from the above formula 14, it can be represented by the following formula 15:

$$e(t) = e^{(A_s - KC)t}e(0) + \int_0^t e^{(A_s - KC)(t-\tau)}b_s(\tau)\Delta p(\tau)d\tau \quad \text{[Formula 15]}$$

According to another further preferred embodiment, when a sixth approximation process for formula 15 is suitably performed, it can be represented by the following formula 16.

The term e(t) for correcting the approximation error in the approximation of formula 15 to formula 16 can preferably be represented by the following formula 17, and when $$\int_0^t e^{(A_s - KC)(t-\tau)}b_s(\tau)d\tau$$

formula 15 is expressed as $\beta(t)$, it can be represented by the following formula 16:

[Formula 16]

$$e(t) + \varepsilon(t) = \underbrace{e^{(A_s - KC)t}e(0)}_{\text{Exponentially vanishes}} + \beta(t)\Delta p(t)$$

Preferably, the first term of the right side in the above formula 16 corresponds to an initial value of the error, which exponentially converged to zero with the passage of time and thus can be disregarded.

[Formula 17]

$$\varepsilon(t) \equiv -\beta(t)\hat{p}(t) + \underbrace{\int_0^t e^{(A_s - KC)(t-\tau)}b_s(\tau)\hat{p}(\tau)d\tau}_{\substack{\text{Value for correcting approximation} \\ \text{error in the approximation} \\ \text{of formula 15 to formula 16}}}$$

$$\beta(t) \equiv \int_0^t e^{(A_s - KC)(t-\tau)}b_s(\tau)d\tau \in \mathbb{R}^3 \quad \text{[Formula 18]}$$

In further exemplary embodiments, the above formula 18 can be presented by the following formula 19, and $\beta(t)$ can be obtained from formula 19:

$$\dot{\beta}(t) = (A_s - KC)\beta(t) + b_s(t),\ \beta(0) = 0 \quad \text{[Formula 19]}$$

Therefore, the observation error can be obtained from the above formula 16, and the final observation error can be obtained from the following formula 20:

$$\check{e}(t) = \beta(t)\Delta p(t), \text{ where } \check{e}(t) = e(t) + \epsilon(t) \quad \text{[Formula 20]}$$

Accordingly, in order to make the observation error equal to zero, the cost function in formula 20 can be defined as the following formula 21:

$$J = \frac{1}{2}\beta^T(t)\beta(t)(\Delta p)^2 \rightarrow \frac{\partial J}{\partial \Delta p} = -\beta^T \beta(t)\Delta p(t) = -\beta^T(t)\check{e}(t) \quad \text{[Formula 21]}$$

Subsequently, when a gradient law is suitably applied to formula 21, it can be represented by the following formula 22:

[Formula 22]

$$\dot{\Delta p} = -\frac{\gamma_0}{\epsilon_0 + \beta^T(t)\beta(t)} \beta^T(t)\check{e}(t),$$

$$\frac{d}{dt}(\omega - \varpi) \approx 0$$

Adaptive gain $$\dot{\hat{p}} = \frac{\gamma_0}{\epsilon_0 + \boxed{\beta^T(t)\beta(t)}} \beta^T(t)\check{e}(t).$$

Gain normalization: Stabilizing the system by changing the gain of the system based on the speed wherein $\gamma_0$ represents the adaptive gain, and $\beta^T(t)\beta^T(t)$ represents the gain normalization factor, which stabilizes the system by changing the gain of the system based on the speed.

Accordingly, in preferred embodiments of the present invention, when a solution of formula 22 is suitably obtained and the resulting information is suitably provided to the adaptive observer configured based on formula 13, that is, when the information related to the speed error required by formula 13 is suitably provided to the adaptive observer, the adaptive observer obtains the position error.

Figure 6:
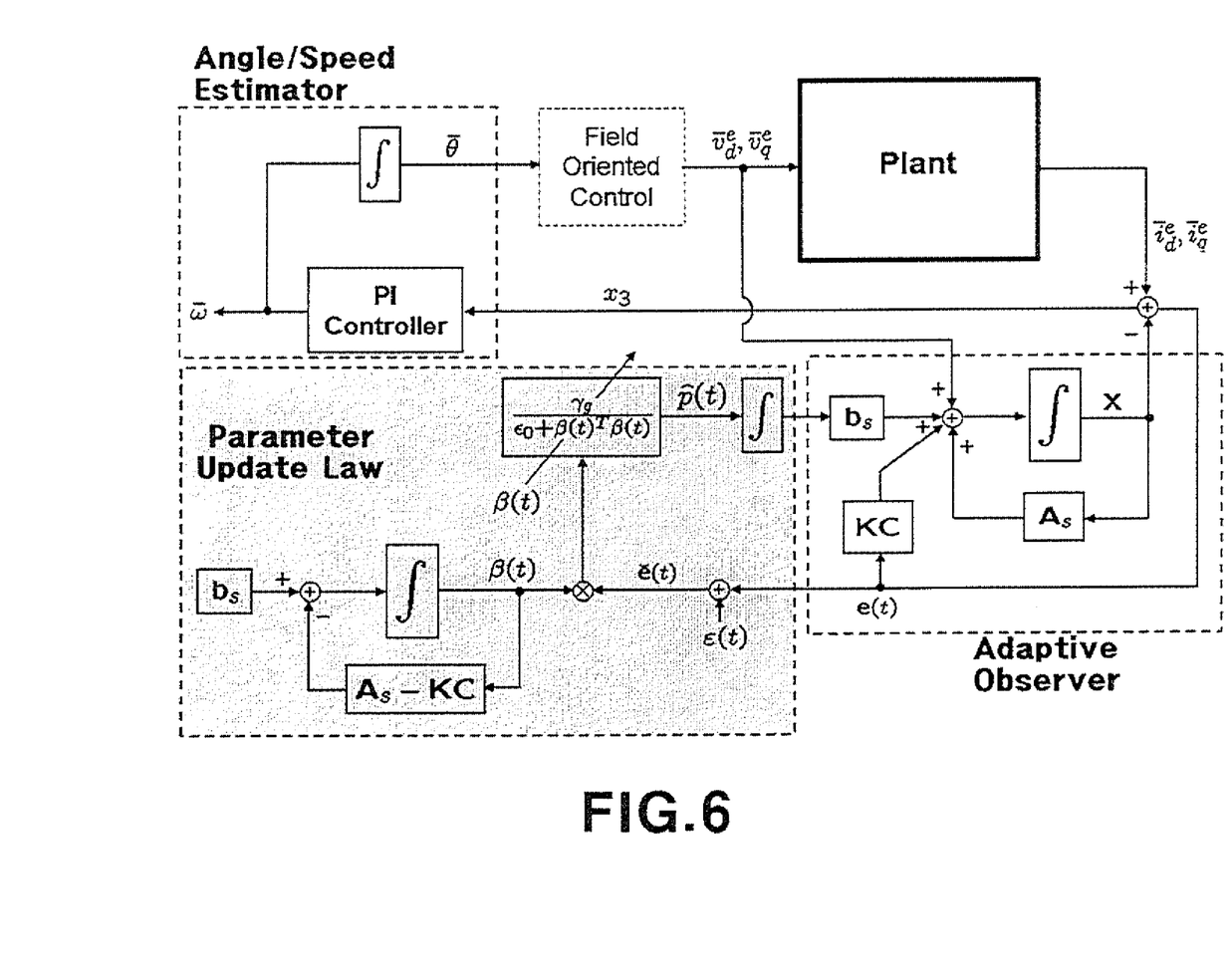
FIG. 6 is a control block diagram of a position sensorless control method of a permanent magnet synchronous motor according to further exemplary embodiments of the present invention.

In other words, as shown in the overall control block diagram of FIG. 6, when a parameter update unit performs a calculation to obtain a solution of formula 22 so as to obtain a suitable tuning parameter value for making the error of the adaptive observer of formula 13 equal to zero and provides the resulting information to the adaptive observer, the adaptive observer suitably performs a calculation to obtain the position error based on formula 13 corresponding to the adaptive law of the adaptive observer.

Figure 5:
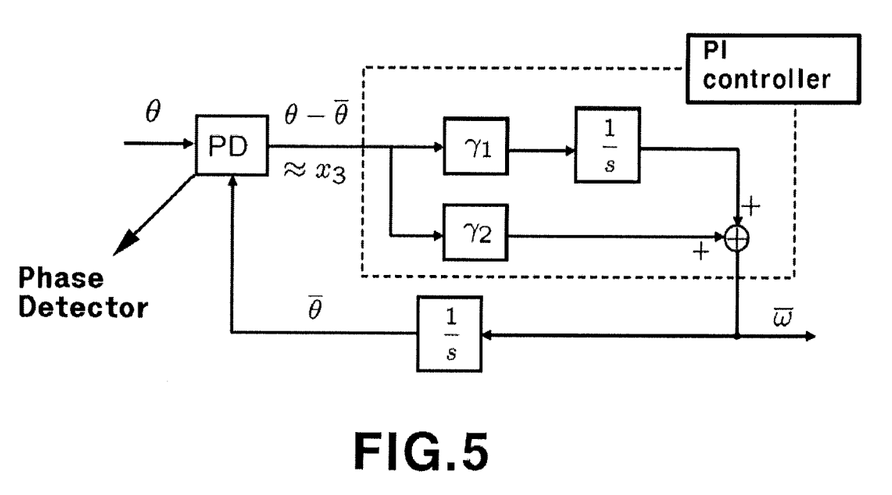
FIG. 5 is an equivalent block diagram of a speed and position estimator, e.g. a phase lock loop controller, according to exemplary embodiments of the present invention.

According to a further preferred embodiment, the adaptive observer suitably estimates the magnetic pole position and speed using a PLL type speed and position estimator as shown in FIG. 5 from the position error obtained from formula 13.

As described herein, the present invention provides a position sensorless control method of a high performance permanent magnet synchronous motor during emergency operation, in which an adaptive observer, which is based on a voltage applied to the motor and a measured current and reflects position and speed error information, is suitably configured from an approximated synchronous coordinate current differential equation model constructed based on a magnetic pole position estimated based on a mathematical model of the permanent magnet synchronous motor such that a magnetic pole position, which can make a magnetic pole position error of the synchronous motor equal to zero, can be estimated using a phase lock loop (PLL) controller from a position error obtained using an adaptive law of the adaptive observer.

Further, since the magnetic pole position, which can make the magnetic pole position of the synchronous motor equal to zero can be accurately estimated, it is possible to ensure normal operation of the synchronous motor without the use of a sensor during emergency operation, which occurs when the sensor detecting the angular position of the permanent magnet synchronous motor for a fuel cell vehicle is out of order.

The present invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A position sensorless control method of a high performance permanent magnet synchronous motor during emergency operation, the method comprising:
   constructing an approximated synchronous coordinate current differential equation model based on a magnetic pole position estimated based on a mathematical model of the permanent magnet synchronous motor;
   configuring an adaptive observer, which is based on a voltage applied to the motor and a measured current and reflects position and speed error information from the approximated synchronous coordinate current differential equation model;
   obtaining a position error using a gradient law of the adaptive observer; and
   estimating a magnetic pole position, which makes a magnetic pole position error equal to zero, using a phase lock loop (PLL) controller from the obtained position error.

2. The method of claim 1, wherein the construction of the approximated synchronous coordinate current differential equation model comprises:
   obtaining error information of the magnetic pole position based on the mathematical model of the permanent magnet synchronous motor;
   approximating the error information to a simpler formula; and
   converting the approximated formula into a differential equation for configuring the adaptive observer.

3. The method of claim 1, wherein the obtaining of the position error using the gradient law of the adaptive observer comprises:
   defining an observation error using the converted differential equation and a formula reflecting the position and speed errors and deriving a differential equation for the error;
   obtaining a final observation error by finding a solution of the differential equation for the error;
   defining a cost function of the final observation error to make the observation error equal to zero and providing speed error information required by the adaptive observer using a gradient law; and
   obtaining the position error from the formula reflecting the position and speed errors of the adaptive observer.

* * * * *